April 26, 1932.    E. C. SASNETT    1,855,926
AUTOMATIC TRAIN CONTROL SYSTEM
Original Filed Dec. 22, 1927
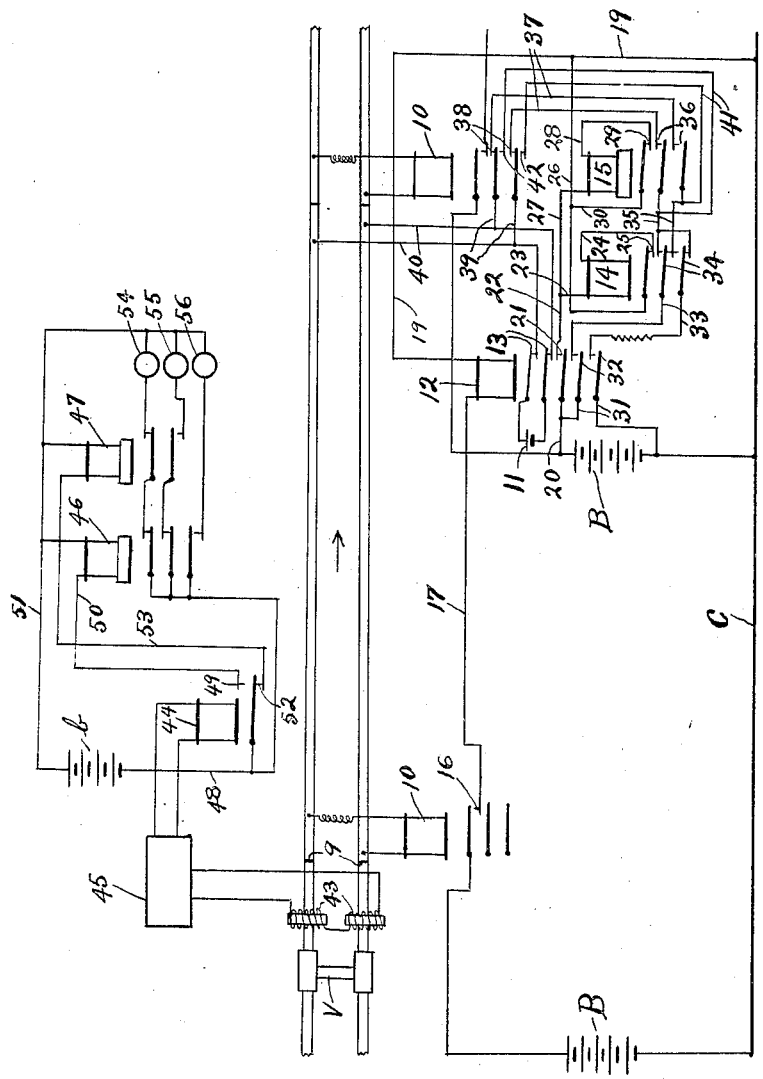
Inventor
Edward C. Sasnett Patented Apr. 26, 1932

1,855,926

UNITED STATES PATENT OFFICE

EDWARD C. SASNETT, OF WASHINGTON, DISTRICT OF COLUMBIA, ASSIGNOR TO THE UNION SWITCH & SIGNAL COMPANY, OF SWISSVALE, PENNSYLVANIA, A CORPORATION OF PENNSYLVANIA

AUTOMATIC TRAIN CONTROL SYSTEM

Application filed December 22, 1927, Serial No. 241,893. Renewed October 6, 1931.

This invention relates to railway traffic controlling systems and particularly to automatic train controlling systems of the code-discontinuous-indication type. The system disclosed in the present application is based upon the system shown and claimed broadly in my copending application, Serial No. 24,544, filed April 20, 1925. The present application is a continuation in part of my copending application Ser. No. 232,664, filed Nov. 11, 1927.

The specific system illustrated herein comprises a track divided into insulated blocks, each block included in a closed track circuit having a battery connected at its exit end and a relay connected at its entrance end, and normally inactive motor devices associated with each track relay rendered operative when a vehicle enters the block to interrupt the normal track current flowing therein and cause relatively strong current impulses to flow in the rails of said block, in combination with a vehicle equipment including a relay which is responsive to the current impulses but unresponsive to the normal track current and having vehicle controlling means held at caution or clear so long as said impulses are received.

Among the advantages of the invention are: The system can be applied to any of the existing automatic block systems using continuous current without alteration of the equipment thereof and without the addition thereto of an expensive high voltage alternating current transmission line. In the present system no false clear or caution indication can arise from failure of insulated joints separating blocks. Finally, the code-applying motor devices are operated only when vehicles enter the respective blocks controlled by said devices which eliminates unnecessary energy output as well as makes it possible to utilize strong current impulses and thereby actuate the vehicle translating devices more positively and indeed under some conditions renders it feasible to do away with sensitive amplifying mechanism on the vehicle.

Referring to the accompanying drawing, which is a diagrammatic representation of a system embodying the invention:—

There is shown a stretch of railway track divided by insulated joints 9 into blocks, only one complete block being shown. The usual track relays 10 are connected across the track rails at the entrance ends of the blocks and track batteries 11 are normally connected across the rails at the exit ends of the blocks through back contacts 13 of relays 12. A relay 12 is associated with each track relay, and also associated with each track relay is a quick acting relay 14 and a slow acting relay 15. Relay 15 is provided with a closed copper ring or shell which renders the relay slow acting both in picking up and in releasing. Normally, relays 12, 14, 15 are deenergized. The apparatus at only one block station is shown on the drawing, it being understood that this apparatus is duplicated at each block station. The track system may of course include the usual track signals controlled by the track relays in any desired way.

When a vehicle enters a block, it causes the circuit of relay 12 associated with the track relay connected to the block immediately in advance to be closed, said circuit being from battery B, back contact 16 of the track relay connected to the block entered, line wire 17, relay 12, conductor 19 and back to battery through the common wire C. The energization of relay 12 disconnects battery 11 from the track rails of the block entered and closes the circuits of relays 14 and 15. The circuit of relay 14 is from battery B, conductor 20, front contact 21 of relay 12, conductors 22 and 23, the winding of relay 14, conductor 24, back contact 25 of relay 14, and back to battery through conductors 26 and 19. Relay 15 is connected in parallel with relay 14 by conductor 27, winding of relay 15, conductor 28, back contact 29 of relay 15, and conductor 30. It will be observed that the circuits of relays 14 and 15 include respectively their own back contacts, so that when the circuits of said relays are closed at front contact 21 the relays will be periodically energized and deenergized, operating their contacts at frequencies depending upon the electrical constants of the relays.

Under clear traffic conditions, when relay 15 closes its front contacts, battery B is connected across the rails of the block immediately in the rear by conductors 31, front contacts 32 of relay 12, conductors 33, contacts 34 of relay 14, conductors 35, contacts 36 of relay 15, conductors 37, front contacts 38 of the track relay, and conductors 39 and 40. It will be observed that relay 14 is adapted to function as a pole changer, its contacts 34 periodically reversing the battery with respect to conductors 35 and the track rails. Since relay 14 is quick acting and relay 15 is slow acting, it follows that while the front contacts 36 of relay 15 are closed the contacts 34 of relay 14 will vibrate a number of times. It will be understood therefore that when a vehicle enters a block under clear traffic conditions, periodic impulses of current periodically alternating in polarity will flow through the rails and through the wheels and axles of said vehicles, said impulses being separated by a definite time interval that is determined by the electrical constants of relay 15.

Under caution conditions, the track relay 10 at the block station illustrated being deenergized, relays 14 and 15 will operate intermittently as under clear conditions, but relay 15 will be ineffective since the connections 37 therefrom are disconnected at the front contacts 38 of said track relay. Under these conditions conductors 35 are connected to the track rails respectively by conductors 41, back contacts 42 of said track relay and conductors 39 and 40. Under caution conditions therefore current periodically alternating in polarity will be continuously applied to the track rails. It may here be pointed out that the track relays are unresponsive to the current periodically alternating in polarity which is caused to flow in the track rails under clear and caution conditions. If these relays are not inherently unresponsive to current of this character, they may be made so by suitable inductances inserted in their connections, as indicated on the drawing. Thus the system is not dependent for safety upon the integrity of the insulated joints separating the blocks.

The drawing indicates a vehicle V represented by a single pair of wheels and an axle. As is customary in continuous indication induction systems of train control, the vehicle is equipped with a pair of coils 43 carried in advance of the first pair of wheels and adjacent the track rails, so as to have threaded therethrough the alternating flux due to the current flowing in said rails. Coils 43 are connected to a relay 44, and an amplifier 45 may be inserted in the connection if desired. Relay 44 controls a pair of slow acting relays 46 and 47. The circuit of relay 46 is from battery $b$, conductor 48, front contact 49 of relay 44, conductor 50, the winding of relay 46, and back to battery through conductor 51. The circuit of relay 47 is from battery $b$, conductor 48, back contact 52 of relay 44, conductor 53, the winding of relay 47, and back to battery through conductor 51.

Under clear traffic conditions periodic impulses of alternating current will be received, periodically energizing relay 44 and causing the circuits of slow acting relays 46 and 47 to be alternately closed. Since these relays are slow acting they will maintain closed their front contacts so long as such impulses are received, completing the circuit of clear lamp 54, which circuit is obvious from the drawing.

Under caution conditions, relay 44 will be continuously energized, holding closed the circuit of relay 46 and holding open the circuit of relay 47. Relay 47 therefore will drop its contacts, completing the circuit of caution lamp 55. When alternating current is absent from the track rails, relay 46 will be deenergized, closing the circuit of danger lamp 56.

The voltage of battery B which is applied to the rails of the block associated therewith when a vehicle enters said block, may be of any desired value. If an amplifier is used on the vehicle the voltage may, for example, be twelve volts, or about double the usual voltage of the track battery, but the voltage may be much higher than this without excessive waste of energy by leakage thru the track ballast, as the higher voltage is applied only intermittently and only when a vehicle is present. It is entirely feasible therefore to make the impulses strong enough to actuate a sensitive relay on the vehicle directly without the aid of amplifying mechanism.

I claim:

An automatic train control system comprising in combination, a track divided into insulated blocks, a track relay connected across the rails at the entrance end of each block, a track battery connected across the rails at the exit end of each block, means operating when a vehicle enters a block to disconnect the track battery of that block and cause current periodically alternating in polarity to flow in the rails of that block intermittently when the track relay next in advance is energized and constantly when said track relay is deenergized, a vehicle having a relay responsive to current periodically alternating in polarity flowing in the rails, two slow acting relays connected respectively to the front and back contacts of said vehicle relay, a clear signal having a circuit including in series front contacts of said slow acting relays, and a caution signal having a circuit including in series a front contact of that slow acting relay which is connected to the front contact of said vehicle relay and a back contact of the other slow acting relay.

In testimony whereof I hereunto affix my signature.

EDWARD C. SASNETT.